United States Patent [19]

Couch, Jr. et al.

[11] 4,203,022
[45] May 13, 1980

[54] METHOD AND APPARATUS FOR POSITIONING A PLASMA ARC CUTTING TORCH

[75] Inventors: Richard W. Couch, Jr.; William V. Bailey, both of Hanover, N.H.

[73] Assignee: Hypertherm, Incorporated, Hanover, N.H.

[21] Appl. No.: 846,637

[22] Filed: Oct. 31, 1977

[51] Int. Cl.² ............................................. B23K 9/00
[52] U.S. Cl. ........................ 219/121 P; 219/124.02; 219/124.34
[58] Field of Search ............... 219/75, 121 P, 124.02, 219/124.34; 73/37.5

[56] References Cited

U.S. PATENT DOCUMENTS

| | | | |
|---|---|---|---|
| 3,082,314 | 3/1963 | Arata et al. | 219/75 |
| 3,366,772 | 1/1968 | Wickham et al. | 219/75 |
| 3,426,175 | 2/1969 | Hahne | 219/124.02 |
| 3,579,068 | 5/1971 | Tschang | 219/124.02 |
| 3,641,308 | 2/1972 | Couch, Jr. et al. | 219/121 P |
| 3,641,810 | 2/1972 | Smirmaul | 73/37.5 |
| 3,709,027 | 1/1973 | Beeken | 73/37.5 |
| 3,712,318 | 1/1973 | Kopera | 73/37.5 |
| 3,819,840 | 6/1974 | Schultz | 219/121 P |
| 3,881,357 | 5/1975 | Sahlin | 73/37.5 |

FOREIGN PATENT DOCUMENTS

| | | | |
|---|---|---|---|
| 223227 | 11/1968 | U.S.S.R. | 219/124 |
| 231686 | 4/1969 | U.S.S.R. | 219/124.02 |
| 277148 | 11/1970 | U.S.S.R. | 219/124 |

OTHER PUBLICATIONS

H. A. Khoury, "Non Contact Displacement Feedback Transducer," *IBM Tech. Disc. Bulletin*, vol. 13, #3, 8/1970, p. 766.

Primary Examiner—B. A. Reynolds
Assistant Examiner—Clifford C. Shaw
Attorney, Agent, or Firm—Kenway & Jenney

[57] ABSTRACT

The positioning method disclosed herein is particularly applicable to a plasma arc cutting torch of the type in which tangential swirl is imparted to an ionizable gas through which the arc discharge takes place. The gas flow is initiated while the torch is in a retracted position and the torch is then advanced toward the workpiece. The vortex pressure is sensed and a signal is generated which is responsive to changes in vortex pressure. The advance of the torch is terminated in response to a change in the signal corresponding to the abrupt drop in the vortex pressure caused by attachment of the vortex to the workpiece.

6 Claims, 6 Drawing Figures

METHOD AND APPARATUS FOR POSITIONING A PLASMA ARC CUTTING TORCH

BACKGROUND OF THE INVENTION

The present invention relates to plasma arc cutting torches and more particularly to a method and apparatus for initially positioning such a torch with respect to a workpiece.

Various methods and systems are known for exercising control over the position of a welding head during the welding process so as to maintain a proper arc length. Such methods are conventionally employed for consumable electrode welding and TIG (tungsten-inert gas) welding and typically sense arc voltage or arc impedance as a parameter upon which the height of the torch is predicated. Such systems are also adaptable for use in plasma arc cutting where an arc is generated through an ionizable gas jet to generate a high velocity plasma which actually cuts the workpiece.

The present invention is directed toward the problem of initially positioning a plasma arc torch before the arc is struck, i.e. the bringing of the torch head close enough to the workpiece so that the arc may be reliably struck without advancing the torch until it actually contacts the workpiece. The nozzle which constitutes the lowermost portion of the torch is typically constructed of a ceramic material which is both non-conductive and which can withstand the heat generated but which is relatively brittle and can be easily damaged. Typically, initial positioning of such torches has been accomplished under manual control of the operator who visually observes the height of the torch head relative to the workpiece. Such visual observation is difficult in situations where large plates are being cut and the torch may be some distance from the operator. Accordingly, initial positioning under manual control based on visual observation has frequently resulted in damage to the ceramic torch nozzle when the torch inadvertently contacts the workpiece.

SUMMARY OF THE INVENTION

In plasma arc cutting torches of the type described above, a swirling motion is commonly imparted to the ionizable gas through which the arc discharge is to take place. This swirling motion has been found to improve the quality of the cut obtained. In accordance with one aspect of the present invention, it has been determined that, if this swirling flow of gas is started while the torch is retracted, a relatively weak vortex is formed. Then, if the torch is advanced toward the workpiece, the vortex pressure within the torch will drop relatively abruptly when the torch approaches the workpiece and the vortex subsequently attaches to the workpiece. Accordingly, by providing a transducer which generates a signal responsive to changes in vortex pressure, the advancement of the torch towards the workpiece can be terminated under automatic control in response to that signal so that the location of the torch relative to the workpiece can be predetermined.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
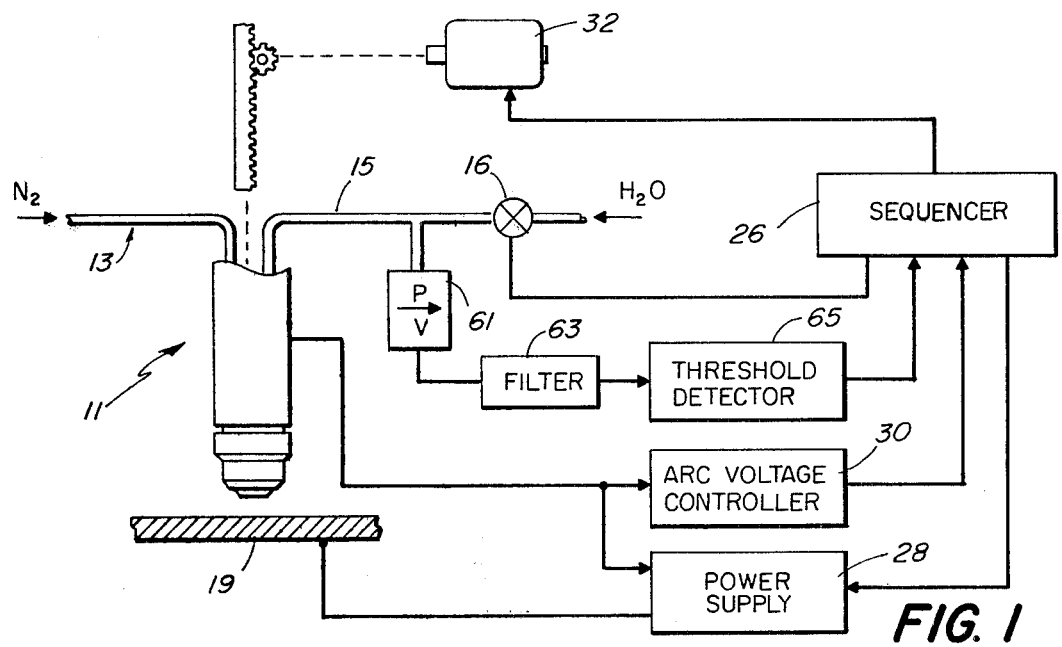
FIG. 1 is a block diagram of plasma arc cutting torch apparatus employing the initial positioning method of the present invention.

Referring now to FIG. 1, a plasma arc cutting torch itself is indicated generally by reference character 11. This torch may, for example, be the water-arc cutter model PAC-400 manufactured and sold by Hypertherm, Inc. of Hanover, N.H. This type of torch is conventionally operated to generate a plasma arc in an ionizable gas such as nitrogen ($N_2$), a helical swirl being imparted to the gas within the torch to improve the characteristics of the cut. The nitrogen gas inlet is indicated in FIG. 1 by reference character 13. This type of torch also employs a water injection system for constricting the plasma arc as it is emitted from the torch, the water inlet to the torch being indicated by reference character 15 with a solenoid valve 16 being provided for controlling the water flow. Gas swirling and water injection schemes of this general type are described, for example, in U.S. Pat. Nos. 2,806,124; 2,906,858; and 3,082,314. Such torches are typically employed for cutting a metal workpiece such as steel plate, i.e. as indicated at 19 in FIG. 1. A power supply for providing the electrical energy to the torch is indicated at 28 and an arc voltage controller which senses the arc voltage and controls the torch height during actual cutting is indicated at 30. The actual moving of the torch in a vertical direction is accomplished by a servo motor 32. As is conventional, an overall controller or sequencer 26 is employed which provides for optional manual positioning of the torch in both vertical and lateral directions and for providing an appropriate start-up sequence.

Figures 2, 3, 4:
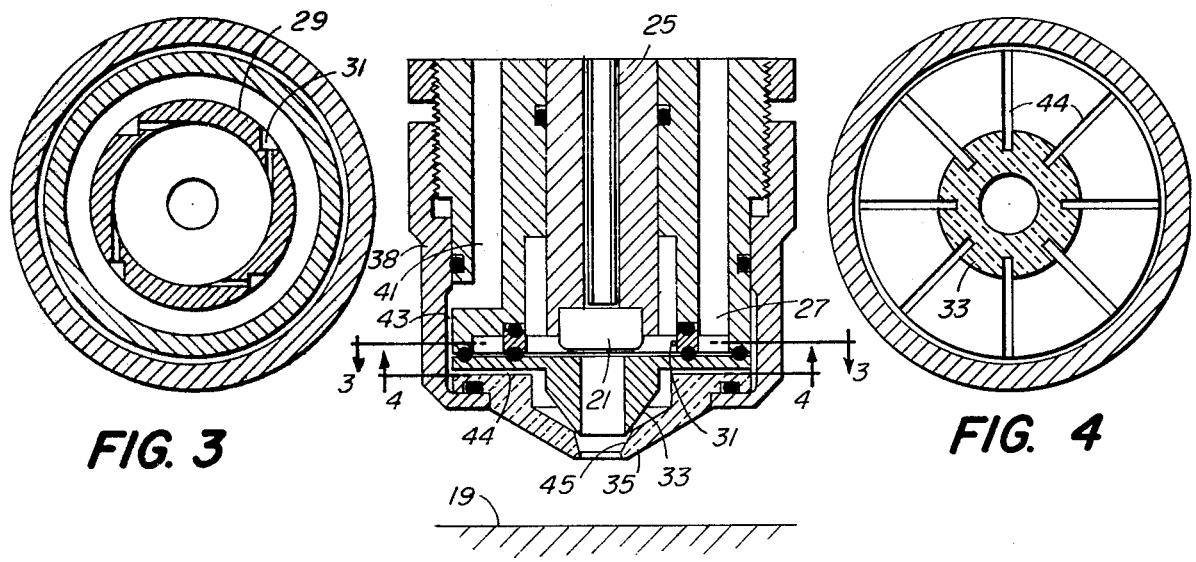
FIG. 2 is a cross-sectional view, to enlarged scale, of the torch employed in the FIG. 1 system.
FIG. 3 is a transverse sectional view, taken substantially on the line 3—3 of FIG. 2, showing internal ports within the torch.
FIG. 4 is a similar transverse cross-sectional view taken on the line 4—4 of FIG. 2.

The construction of the torch nozzle is illustrated in greater detail in FIGS. 2-4. During the arc discharge, conduction takes place between a tungsten electrode, designated by reference character 21, and the workpiece 19. Electrode 21 is mounted on a hollow metal stem 23 and is cooled by means of water directed thereto through a tube 25 running within the hollow stem 23.

As indicated previously, the arc discharge takes place through an ionizable gas and a helical swirl is imparted to the gas to improve the quality of the cutting action. With reference to FIG. 2, ionizable gas entering through a port 27 in the torch body is admitted to the space around the electrode 21 through a ring 29 containing a plurality of tangential ports 31 which impart the desired tangential spin to the gas. The details of the tangential port orientation may be seen in FIG. 3. This gas flow exits from the body through a pair of nozzle elements 33 and 35. The nozzle element 33 is made of copper and element 35 is ceramic. The nozzle elements are clamped to the torch body 30 by a threaded annular clamp ring 38. Various O-ring seals are provided as indicated in FIG. 1.

The nozzle elements 33 and 35 themselves form a water jet assembly for directing an annular jet of water against the arc and desirably confine the cutting area. Water entering the torch through a port 41 passes through an annular space 43 in the clamp ring 38 which takes it around the gas injection ports. From the circumferential space 43, the water passes through radial passages 44 into the annular nozzle 45 formed between the nozzle elements 33 and 35. The radial passages 44 may be seen in greater detail in the section of FIG. 4.

Figures 5, 6:
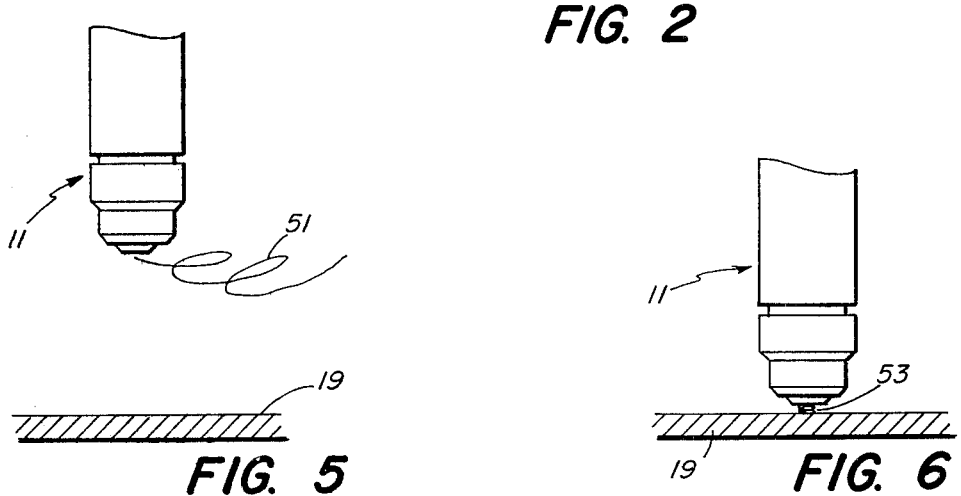
FIG. 5 is a diagrammatic illustration showing the torch initially spaced from the workpiece with a weak, unattached vortex.
FIG. 6 is a view similar to FIG. 5 showing the torch in relatively close proximity to the workpiece with a strong, attached vortex.

If, while the torch is retracted from the workpiece, the gas flow is turned on while the water flow is left off, the gas will exit through the nozzle elements in a very weak vortex. This is illustrated somewhat diagrammatically at reference character 51 in FIG. 5. If the torch is then gradually advanced toward the workpiece 19, a point will be reached at which the vortex will attach to the workpiece and become much stronger and well defined. This attached vortex is indicated at 53 in the diagrammatic illustration of FIG. 6. The vortex attachment occurs relatively abruptly and is accompanied by a similarly abrupt drop in the pressure within the vortex, i.e. the pressure within the nozzle itself.

While the pressure within the nozzle can be detected by measuring the gas inlet pressure, such a measurement is obscured by the various pressure drops which occur along the line of flow. Accordingly, in the practice of the present invention in a plasma arc cutting system employing water injection, it is greatly preferred that the pressure sensing be done through the water injection pathway. During the initial approach of the torch, there is no need to have the water flowing and thus this hydraulic pathway forms a nearly ideal sensing port to the nozzle area and is quite effective in sensing the abrupt change in pressure caused by vortex attachment, even when the intervening line is full of water. Using the Hypertherm model PAC-400 torch with a nitrogen flow of 160 cubic feet per minute, the pressure at the water injection port will change abruptly from about 3.1 pounds per square inch to about 1.8 pounds per square inch as the torch comes within 0.12 inches of a flat workpiece.

In the system of FIG. 1, the pressure in the water inlet line is sensed by means of a pressure transducer 61 which provides a voltage signal corresponding to the extant pressure. In order to eliminate d.c. or static offsets, e.g. as might be due to a varying static head of water in the line, the signal from transducer 61 is passed through a filter 63 before being applied to a threshold detector 65 which then responds essentially only to the abrupt transition which occurs when the vortex attaches. Threshold detector 65 in turn provides a suitable switching signal to the sequencer 26 which operates to terminate the advance of the torch 11. Once the initial height is established in this manner, the sequencer 26 activates the plasma system in the conventional manner so that the arc is initiated and thereafter turns control of the height-adjusting motor 24 over to the arc-voltage controller 30 which continuously adjusts the height of the torch 11 to maintain the desired arc voltage or impedance.

Using this approach, it has been found that the vortex pressure increases slightly before the effect of vortex attachment reduces the core pressure. Thus an alternative threshold detector can be used to sense this change in core pressure. In addition, the threshold detector can be designed to first detect the increase and then the decrease in core pressure in order to improve reliability and increase noise immunity.

From the foregoing, it can be seen that the present invention is operative to provide a signal which indicates when the torch closely approaches the workpiece. Further, this signal is very well defined and is generated without utilizing complex capacitive proximity sensors or unreliable mechanical feelers. The degree of automation utilized in employing this invention is essentially a matter of choice. In some applications it may suffice to just de-energize the motor 24 when it is being advanced under manual control whereas in other situations the entire positioning, ignition, and initial undertaking of cutting may be all under automatic control in the manner described in general in the foregoing description.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of initially positioning a plasma arc cutting torch relative a workpiece, the torch being of the type in which a swirling motion is imparted to an ionizable gas through which the arc discharge takes place and in which water is injected to constrict the arc discharge as it leaves the torch; said method comprising:
    initiating the flow of ionizable gas while the torch is in a retracted position and in which the water supply is turned off;
    advancing the torch toward the workpiece;
    sensing the vortex pressure within the torch through the water injection conduit and generating a first signal responsive to changes in the vortex pressure;
    generating a switching signal only when said first signal corresponds to the abrupt drop in said vortex pressure occurring at attachment of the vortex to the workpiece; and
    terminating the advance of the torch in response to said switching signal.

2. Plasma arc cutting apparatus comprising:
    a plasma arc torch including means for imparting a swirling motion to an ionizable gas through which the arc takes place; power supply means for generating an arc discharge between said torch and a workpiece;
    means for sensing the vortex pressure of the ionizable gas within the torch and generating a first signal which varies as a function of changes in that pressure;
    means for generating a switching signal only when said first signal corresponds to the abrupt drop in said vortex pressure occurring at attachment of the vortex to the workpiece;
    means for initially advancing said torch towards the workpiece and terminating the advance in response to said switching signal.

3. Plasma arc cutting apparatus comprising:
    a plasma arc torch including an inlet for an ionizable gas through which the arc takes place and a nozzle through which the plasma arc is ejected, said gas inlet including means for imparting a helical swirl to the gas;

power supply means for generating an arc discharge between said torch and a workpiece, said nozzle including an annular water injection port surrounding the plasma arc for constricting the arc discharge;

means for sensing pressure through said annular water injection port of the ionizable gas thereby generating a first signal which varies as a function of changes in the gas vortex pressure within the torch;

means for generating a switching signal only when said first signal corresponds to the abrupt drop in said vortex pressure occurring at attachment of the vortex to the workpiece;

means for initially advancing said torch towards the workpiece and terminating the advance in response to said switching signal.

4. Apparatus as set forth in claim 3 wherein said sensing means includes a pressure transducer interconnected with said annular water injection port and wherein said apparatus includes means for turning off the water flow through said port during said initial advancing of said torch.

5. Apparatus as set forth in claim 4 including signal filter means responsive to a signal generated by said transducer for blocking d.c. and static input components in said signal.

6. Apparatus as set forth in claim 5 wherein said switching signal-generating means includes a threshold detector responsive to said transducer signal for providing a switching signal when said transducer signal reflects an abrupt drop in the torch vortex pressure.

* * * * *